United States Patent [19]
De Vita et al.

[11] 3,843,883
[45] Oct. 22, 1974

[54] THREAD USE MONITOR

[75] Inventors: Raymond A. De Vita, Hamilton; Adolph S. Dorosz, Beverly; Nicholas P. Szydlek, Lynn, all of Mass.

[73] Assignee: USM Corporation, Boston, Mass.

[22] Filed: Mar. 8, 1973

[21] Appl. No.: 339,161

[52] U.S. Cl. .............. 250/233, 112/219 R, 340/220, 250/209, 235/92 V
[51] Int. Cl. ............................................. G01d 5/36
[58] Field of Search ........... 250/233, 560, 571, 209, 250/208; 356/238; 112/219 R, 219 A; 235/61.11 E, 92 V; 340/220

[56] References Cited
UNITED STATES PATENTS

| | | | |
|---|---|---|---|
| 3,264,559 | 8/1966 | Eppler | 250/560 X |
| 3,355,591 | 11/1967 | Pfister | 250/560 |
| 3,408,500 | 10/1968 | Carr | 250/233 X |
| 3,739,183 | 6/1973 | Burton et al. | 356/238 X |

*Primary Examiner*—Walter Stolwein
*Attorney, Agent, or Firm*—Ralph D. Gelling; Vincent A. White; Richard B. Megley

[57] ABSTRACT

A method and apparatus for monitoring use of a thread-like element to detect improper operation of a machine utilizing the element. The monitored amount of element use in a machine cycle is compared to a preset standard of element use for the machine cycle during proper operation of the machine. Deviation from the preset standard is then effective to provide a signal. The signal preferably disables the machine from further operation and activates an alarm indicative of the detected improper operation. The machine cycle for the preset standard is a function of real machine operations, preferably a predetermined number of real cycles of machine operation.

4 Claims, 4 Drawing Figures

THREAD USE MONITOR

BACKGROUND OF THE INVENTION

This invention relates to a monitor for detecting use of thread-like elements.

Many industrial operations involve thread, yarn, string, twine, rope, cables or other thread-like elements. In many of these operations, the thread-like element is consumed, integrated with other elements or otherwise utilized during the industrial operation. For example, in sewing, weaving, wire insulating and cable manufacture, thread-like elements are combined or integrated with other elements to form a finished workpiece. Where these and other element utilizing operations are performed by automatic machinery, it is undesirable to employ an operator to monitor proper utilization of the element. Similarly, where the element is small or utilized at a rapid rate, it is difficult for an operator to manually detect proper utilization of the element.

Improper utilization of the thread-like element includes failure to utilize any of the element in the operation as where the element breaks prior to utilization. It may also include insufficient or excessive element utilization as where a tension on the element becomes too high or low so as to permit the insufficient or excessive utilization of the element in the industrial operation. Because element breakage as well as insufficient or excessive element utilization result from a tensile condition of the element it is known to monitor the tensile condition of the element to detect improper operation of machines utilizing the element. For example, U.S. Pat. No. 3,672,315, issued June 27, 1972, in the name of Rockwell and copending United States patent application Ser. No. 165,040, filed July 23, 1971 in the name of MacKenzie et al. each disclose such tension detectors.

The tension detectors of the above patent and application are preferably intended for use on a sewing machine. Many sewing machines as well as machines for other industrial operations utilize multiple threadlike elements. For example, in lockstitch sewing machines, a needle and a bobbin thread are utilized. The utilization of one thread may be dependent upon the utilization of another, but the tension of each thread is not necessarily so dependent. In a lockstitch sewing machine, for example, absence of a bobbin thread will prevent formation of stitches and consequent use of needle thread but may not significantly effect the tension of the needle thread. This problem in lockstitch sewing machines is particularly acute when sewing a row of stitches in certain directions relative to sewing instrumentalities of the machine. Separate tension detectors for each element utilized in a machine are then necessary to determine improper operation of the machine. Furthermore, tension variations between proper and improper machine operation may be so small as to be difficult to detect.

SUMMARY OF THE INVENTION

Accordingly, it is an object of the invention to provide a monitor of the use of thread-like elements to detect improper operation of a machine utilizing the element.

To this end, the invention provides a monitor of thread-like element use. A monitored amount of element use in a machine cycle of the machine utilizing the element is compared to a preset standard of element use for the machine cycle during proper operation of the machine. Deviation of the monitored element use from the preset standard is effective to provide a signal. The signal preferably disables the machine from further operation and may also activate an alarm indicative of the detected improper operation. The machine cycle for the preset standard is a function of real or actual operations of the machine, preferably a predetermined number of repetitive machine operations for a machine performing similar, repetitive functions during its operation such as the formation of multiple stitches.

DESCRIPTION OF THE DRAWINGS

A preferred embodiment which is intended to be illustrative of and not a limitation on the invention will now be described with reference to drawings of the preferred in which.

DESCRIPTION OF THE PREFERRED EMBODIMENT

Figure 1:
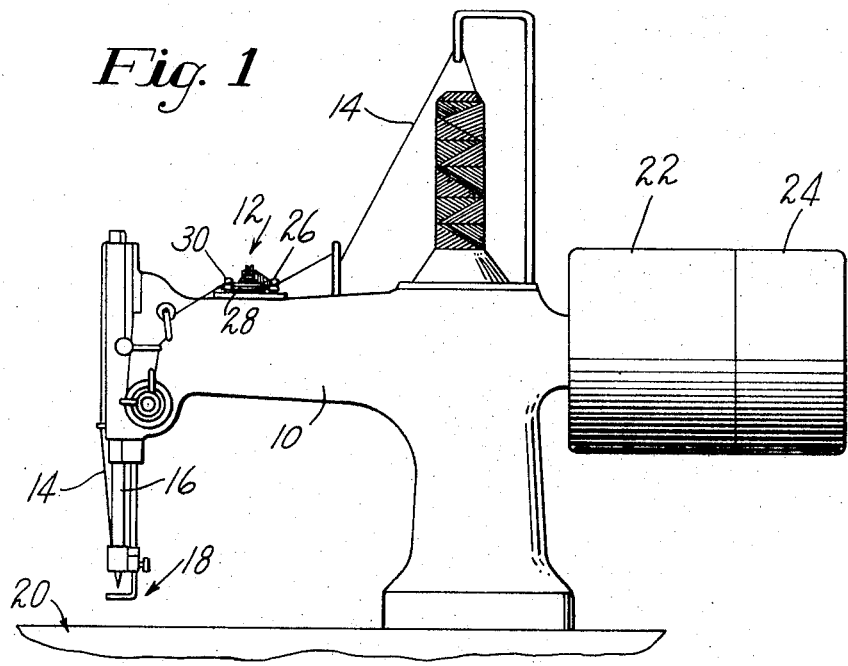
FIG. 1 is a plan view of the preferred embodiment on a sewing machine.

As seen in FIG. 1, a sewing machine 10 of a well known lockstitch type is provided with a monitor generally at 12 for detecting use of thread 14 or other thread-like element utilized in the sewing operation of the machine. The thread passes from a storage spool through the monitor to a needle 16 comprising a portion of stitch forming instrumentalities generally at 18 of the sewing machine. As known in lockstitch sewing machines, the stitch forming instrumentalities include a bobbin thread operative with the stitch forming instrumentalities in a hook portion generally at 20 of the sewing machine.

As in known sewing machines a motor 22 drives the needle in cyclical, work penetrating, linear movement to form a stitch in a workpiece (not shown) disposed between the needle and the hook portion. The driving connection of the motor to the needle is such that each stitch forming movement of the needle corresponds to a constant number of degrees of rotation of the motor, generally 360° per stitch forming movement of the needle. With such machines, it is known to connect a shaft encoder 24 of known construction to the motor to provide a signal for each number of degrees of motor rotation corresponding to a stitch forming movement of the needle; in the above example, one signal per revolution of the motor. Alternatively to a commercial shaft encoder, an encoder may be made from a disk having peripheral perforations at each number of degrees about the circumference of the disk corresponding to those of the motor rotation for each stitch forming movement of the needle and a commercial photon coupled interrupter in general similarity with the corresponding portions of the monitor as hereinafter described.

U.S. Pat. No. 3,367,296 issued Feb. 6, 1968, in the name of Harruff, discloses further mechanisms effective to terminate operation of the sewing machine in response to a signal, particularly wth the needle in a known position relative to each other stitch forming instrumentalities. Apparatus of the type disclosed in the Harruff patent is incorporated in the preferred embodiment of this invention.

Figure 2:
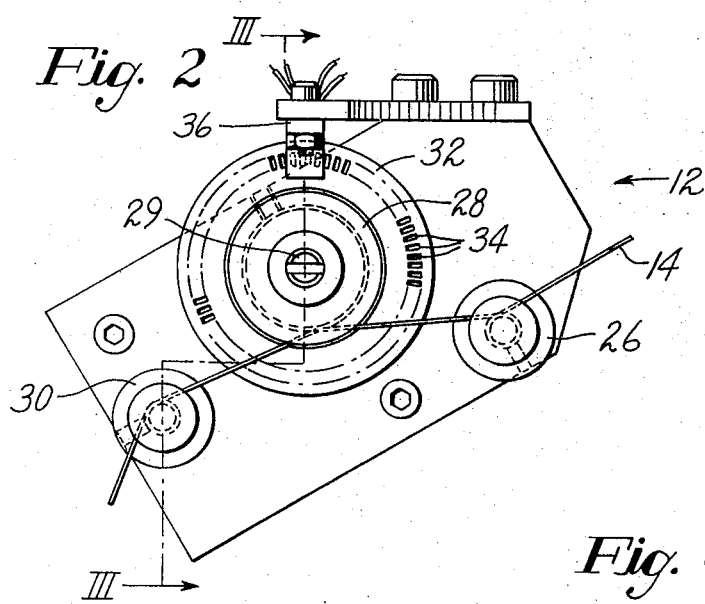
FIG. 2 is a top view of the preferred embodiment.

As seen in FIGS. 1 and 2, the thread enters the monitor through a thread positioning device 26, proceeds around a thread engaging wheel 28 and leaves the monitor through another thread positioning device 30. The thread positioning devices 26 and 30 are of known construction having generally freely rotating, resiliently spaced upper and lower members for positioning the thread generally in the plane of the thread engaging wheel 28 while permitting its free running through the devices. The thread engaging wheel 28 is rotationally mounted on a shaft 29 and connected to a disk 32 also rotationally mounted on the shaft. The disk has a plurality of peripheral perforations 34 uniformly spaced about the circumference of the disk.

Figure 3:
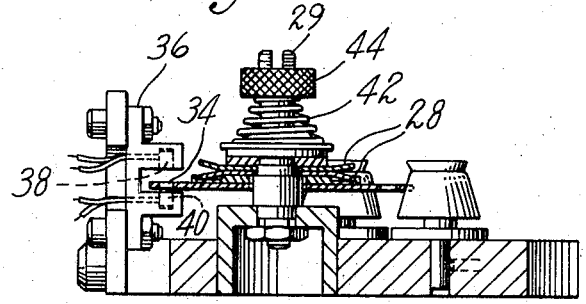
FIG. 3 is a side view of the preferred embodiment.

As better seen in FIG. 3, a generally U-shaped device 36 is mounted to receive the disk between tines forming the U. A photoelectric device and light source 38 and 40, respectively, are disposed on opposite tines of the U in alignment with the peripheral perforations 34 of the disk. Rotation of the disk on the shaft 29 then alternately passes a perforation 34 and a disk portion intermediate adjacent perforations between the photoelectric device and light source to generate an electric pulse for each change in illumination of the photoelectric device by the light source produced by the alternating perforations and disk portions. The device 36 may, for example, be a commercially available photon coupled interrupter. As thus described, the disk and device are a specific type of shaft encoder.

As further seen in FIG. 3, apparatus for causing the thread engaging wheel 28 to resist rotation is provided. The apparatus comprises a compression spring 42 wound about the shaft 29 to frictionally engage the wheel and a spring-holding nut 44 threadedly engaged with the shaft 29. Rotation of the nut relative to the shaft variably compresses the spring 42 against the wheel to variably set the frictional resistance to rotation of the wheel 28.

The wheel 28 has a peripheral V groove for receiving the thread. The thread snugly engages the V groove without slipping about the wheel. Use of the thread then draws the thread through the monitor to rotate the wheel. The wheel also provides tension to the thread from the resistance to rotation given the wheel by the spring. The monitor therefore also serves as a thread tension device. In an alternative but also preferred embodiment, further means for predeterminedly compressing the spring independent of the nut 44 may be provided according to the teachings of copending United States patent application Ser. No. 299,945, filed Oct. 24, 1972, in the name of DeVita et al.

Figure 4:
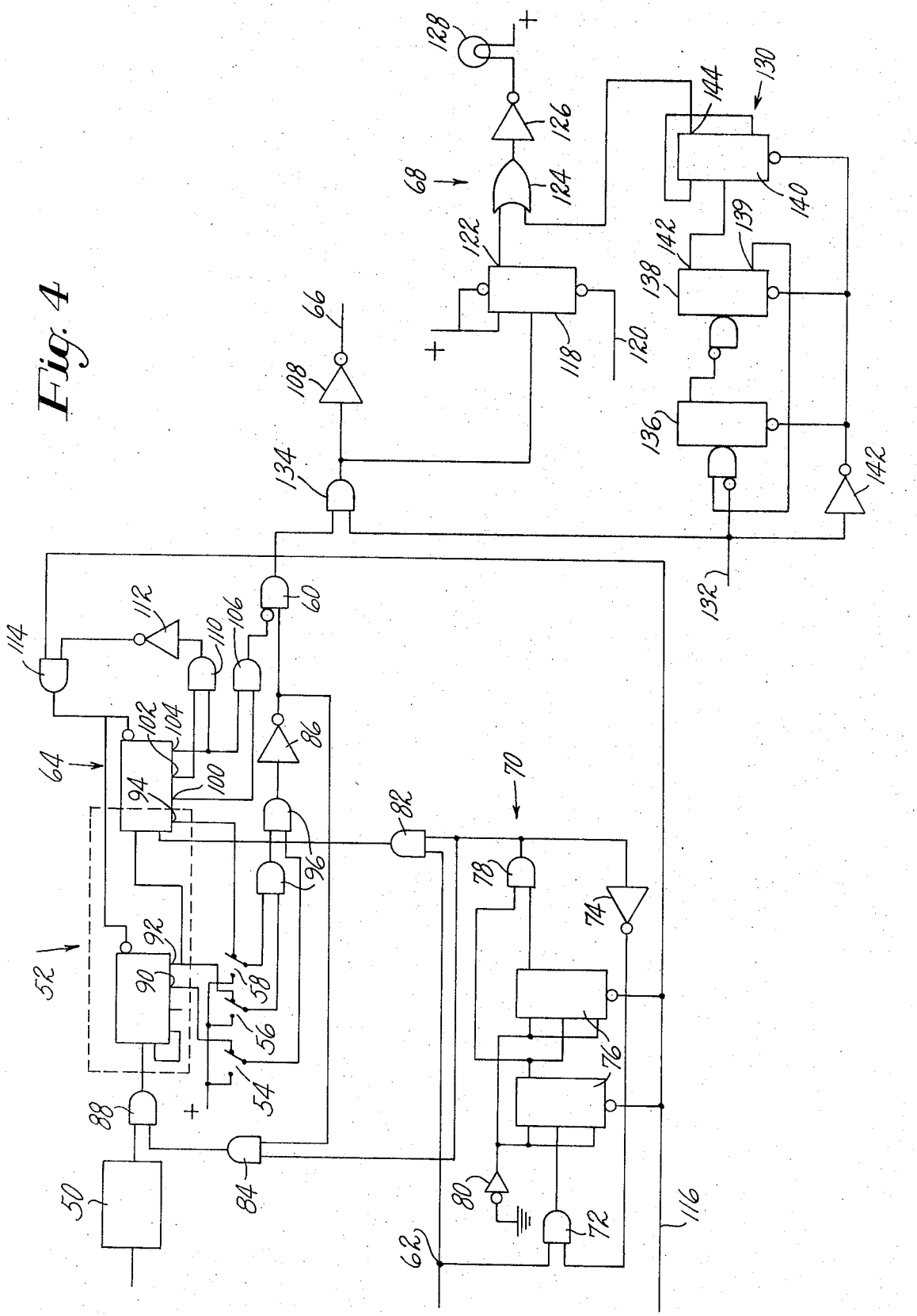
FIG. 4 is a schematic of a control circuit for the preferred embodiment.

Turning now to FIG. 4, the electric pulses from the photoelectric device 40 are received by a pulse shaping device 50 such as a Schmitt trigger of known construction. In general, the shaped pulses are provided to a pulse counter, generally at 52. A series of selector switches 54, 56 and 58 are preset to a number of pulses to be counted and provide a signal to an AND gate 60 when the preset number of pulses has been counted to indicate preset thread use. The shaft encoder 24 on the sewing machine provides a train of pulses to a port 62, each pulse representing a real stitch forming movement of the sewing instrumentalities 18 at the machine or a real operation cycle of the machine. Pulses representing these real cycles of machine operation are provided to a further counter generally at 64 which provides a signal to the gate 60 only when a predetermined number of rear machine cycles have been counted by the counter 64. Each signal from the counter 64 to the gate 60 therefore determines a machine cycle. With appropriate signals from the counters 52 and 64 on its input ports, the gate 60 provides a signal which, preferably under other appropriate conditions, is provided to an output port 66. The signal at the output port is preferably effective to stop operation of the sewing machine, for example, as taught by the cited Harruff patent, and also to trigger an alarm generally at 68 for notifying an operator that the machine has been stopped by the monitor.

Considering the schematic of FIG. 4 in further detail, pulses from the shaft encoder 24 of the sewing machine arriving at the port 62 are fed to a circuit section generally at 70 which functions as a counter. The section 70 counts the initial pulses received at the port 62 representing certain initial stitch forming movements of the sewing instrumentalities 18 in an individual sewing operation. At the completion of a predetermined number of initial pulses representing a corresponding number of initial stitches, the section 70 enables the remaining circuit to perform its function. This circuit section functions to prevent erroneous readings of the monitor which may result from unusual thread usage during initial stitch formations. For example, slack thread adjacent the stitch forming instrumentalities may result in no thread being drawn through the monitor during initial stitch formation. When the monitor detects no use of thread during thread utilizing stitch forming operation of the machine, it would ordinarily disable further machine operation. The section 70 prevents the monitor from disabling the machine operation during these initial and evanescent thread use anomalies.

To this end, the section 70 has an AND gate 72 receiving the pulses from the port 62 and an enabling signal from an inverter 74. The pulses from gate 72 are provided to a pair of J-K flipflops 76 connected in cascade to each other and having corresponding state outputs of each flipflop connected to an AND gate 78. Each of the flipflops is properly enabled through an inverter 80. In general, other enabling signals and unused ports frequently found on commercial devices of the type described in the schematic are not shown.

A first pulse through the gate 72 will then complement a first flipflop 76, a second pulse will again complement the first flipflop 76 and a second flipflop 76 while a third pulse will again complement the first flipflop 76 to provide a signal on each of the corresponding state ports of the flipflops 76 connected to the AND gate 78. The gate 78 will then provide a signal to a further AND gate 82 which also receives a pulse from the port 62. The signal from the gate 78 also passes through the inverter 74 to disable the input gate 72. The circuit section 70 has been disabled itself permitting pulses from the port 62 to be provided to other circuit sections. Accordingly, the section 70 eliminates the first three stitches from consideration of the monitor. In alternative embodiments of the invention, the section 70 may eliminate from consideration other numbers of initial stitches or be omitted entirely.

An AND gate 84 also receives the signal from gate 78 and a further signal from inverter 86 assuming the counter 52 also connected to inverter 86 is initially set to zero as later explained and the selector switches 54, 56 and 58 set to select a non-zero count in the counter 52. The signal from the gate 84 is provided to further AND gate 88 which also receives pulses from the monitor through the pulse shaper 50. The gate 88 being thus satisfied, the pulses from the monitor are then provided to the counter 52. The counter 52 is a five-bit binary counter composed of appropriate portions of a pair of four-bit binary counters. Output ports 90, 92 and 94 then provide signals for a pulse count of 4, 8 and 16 pulses, respectively. With the selector switches 54, 56 and 58 in the position shown, a preset pulse count of 28 is selected. With the switches in other combinations of positions, other combinations of pulse counts are of course possible. Accordingly, when the counter 52 has counted 28 pulses, a high signal will be provided from each port 90, 92 and 94 through the switches 54, 56 and 58 to a pair of AND gates 96. Each of the AND gates 96 will be satisfied to provide a signal through the inverter 86 and gates 84 and 88 to disable the counter 52. The counter thus determines totla thread use during operation of the counter 52 while the gates 96 compare this use with that indicated by the preset selector switches 54, 56 and 58.

Pulses representing real cycles of machine operation from the port 62 pass through enabled AND gate 82, as already described, to the counter generally at 64. Output ports 100, 102 and 104 of the counter 64 then represent pulse counts of 1, 2 and 4 pulses, respectively. AND gate 106 is connected to the ports 100 and 104 to provide a signal to the gate 60 at the count of five real cycles of machine operation. The signal from counter 64 through the gate 106 thus determines a machine cycle which is a function of real cycles of the machine. In an alternative embodiment of the invention, a different number of real cycles of machine operation may be selected for the machine cycle. If both the counters 52 and 64 and their associated gates are simultaneously satisfied, no signal is provided at the output port 66 after an inverter 108 to disable further machine operation; however, should the counters 52 and 64 and their associated gates not be simultaneously satisfied, a signal does appear at the port 66 to terminate further machine operation.

Since the gate 60 is satisfied by simultaneous signals from counters 54 and 64 determining, respectively, the total thread used and a machine cycle, satisfaction of gate 60 represents thread use for predetermined real cycles or average thread use per machine cycle. Since the selector switches set the thread use pulse count from counter 52 to satisfy gate 60, these switches are preset to a number indicative of thread use during proper operation of the machine, as empirically determined. Failure to satisfy gate 60 then indicates actual thread use in a machine cycle different from that preset or improper operation of the machine.

As taught by the above recited Harruff patent, the momentum of the machine may permit an additional forming movement of the stitch forming instrumentalities 18 after a signal to stop the machine. Such movement will provide one further pulse at port 62 after a terminating signal at the port 66 which will carry the counter 64 to a count of six. The corresponding signals at the ports 102 and 104 then satisfy a gate 110 which provides a signal through inverter 112 and gate 114 to clear both counters 52 and 64 to their initial zero count. Alternatively, a first pulse from a next stitching operation at port 62 will clear the counters.

AND gate 114 is satisfied only by a signal from the inverter 112 and an input port 116. The port 116 preferably receives a signal when and only when the sewing machine motor 22 is operating at its normal, full running speed. A lower acceleration speed is often provided by such motors for initial and final stitches of a sewing machine so as to make mechanically possible the very high running speeds of about 2,000 stitches per minute desirable for such sewing machines. A high running speed and a lower acceleration speed together with switch means proving a signal determinative of the speed are disclosed in the above recited Harruff patent. The port 116 is additionally connected to the flipflop counter section of the circuit generally at 70 to enable the flipflops 76. It has been found that thread use anomalies of the type for which the circuit section 70 is intended to compensate exist not only at the initial starting of the machine but as well at the transition from acceleration to running speed. Acccordingly, a low signal at port 116 disables the circuit section 70 together with the counters 52 and 64 through the gate 114.

As already noted, an alarm generally at 68 is provided in the preferred embodiment. The alarm comprises a flipflop 118 permanently enabled and biased toward its low state when reset by a signal for initiating operation of the motor 22 is also impressed on a reset port 120. When the AND gate 60 is satisfied to provide a machine disabled signal to the output port 66, the signal is also provided to the clock input of the flipflop 118. This signal complements the flipflop to provide a signal at its high output port 122. The signal at the port 122 remains latched-on until the enabling signal indicating desired operation of the motor 22 is removed from the port 120. The signal from the port 122 is conducted through an OR gate 124 and an inverter 126 to drive a lamp 128 visible to an operator and appropriately identified as indicating improper thread use.

The preferred embodiment is additionally provided with a lamp flasher circuit section generally at 130. This section has an input port 132 for completely enabling or disabling the entire thread monitor. A signal to the port 132 may be provided by a switch (not shown). When the monitor is to be used, a high signal is provided to the port 132 and to connected AND gate 134 als receiving the disable signal from the AND gate 60. The gate 134 will then be satisfied only when the entire monitor is enabled by a signal at the port 132 and a signal from gate 60 is to be provided to the output port 66.

The signal at port 132 is further provided to the enable ports of a pair of clock timers 136 and 138 and a flipflop 140 through an inverter 142. Accordingly, the high signal at the port 132 which will permit satisfaction of the gate 134 will also disable the flasher circuit section 130 through the inverter 142. On the other hand, a low signal at the port 132 which will not permit the gate 134 to be satisfied and thus prevent a signal at port 66 will enable the clocks and flipflop 136, 138 and 140. Simultaneously, the low signal from the port 132 is provided to the clock 136 having appropriately coupled discrete timing elements (not shown) as known for such commercial units. The clock 136 will then provide an output pulse to the clock input of the clock 138 which will then complement from a state with a signal at the port 139 to the state with the signal at the port 143. Complementing the signal from the port 139 to the port 143 also disables the clock 136 which then down complements to again down complement the clock 138 which reenables the clock 136, all of course according to the timing provided by the discrete components (not shown). A train of spaced pulses are accordingly provided to the flipflop 140. The flipflop 140 has its clock input connected to the port 142 while its low state output is connected to an enable port of the flipflop. Accordingly, every pulse on the clock input of the flipflop 140 from the port 142 will complement the flipflop 140 to its opposite state in set-reset fashion. The flipflip 140 thus serves to slow the train of pulses from the clock 138 into a further train of pulses having a pulse width corresponding to the pulse period of the clock 138. These pulses appear at an output port 144 of the flipflop 140 which is connected to the OR gate 124 and then through the inverter 126 to the lamp 128. Accordingly, a low signal at the port 132 disabling the entire monitor circuit will cause the lamp 128 to flash according to the pulse train provided from the port 144. An operator is thus alerted that the thread monitor is inoperative.

Having thus described our invention, what we claim is:

1. Apparatus for sensing improper operation of a machine which utilizes thread-like elements in a substantially repetitive cycle comprising:
    A. Sensing means which generate a signal relative to the length of the element actually used during each operative cycle of the machine;
    B. Means for generating a predetermined signal relative to the average length of thread used during a normal cycle of the machine; and
    C. Analyzing means which receive the actual signal and the normal signal and generate an alarm signal relative to the difference between said normal and actual signals.

2. A device for detecting improper thread use in an average stitching cycle of a sewing machine comprising:
    A. a rotary tension device mounted on the sewing machine having a pulley element about which the thread passes in frictional engagement which causes the pulley to rotate as the thread is fed to the needle;
    B. a disk mounted on the pulley for rotation therewith, said disk having apertures uniformly spaced about its periphery;
    C. photoelectric means responsive to light radiated through the disk apertures to generate pulses as the disk rotates, the sum of said pulses being proportional to the length of thread being used;
    D. a first counter for summing the pulses received from the photoelectric means, and for passing a signal after a preset sum has has been reached;
    E. pulse generating means operatively associated with the sewing machine drive to generate pulses proportional to the number of sewing cycles in an operation of the machine;
    F. a second counter for summing machine cycle pulses and for passing a signal after a preset number of cycles have been performed;
    G. gating means responsive to the signals passed from the first and second counters to pass an alarm signal when the first counter indicates that the preset sum has not been reached during the preset number of cycles summed by the second counter; and
    H. a warning device responsive to the alarm signal to notify a machine operator that a malfunction has occurred.

3. A device for detecting improper thread use in an average stitching cycle of a sewing machine as described in claim 2 further comprising:
    means associated with the second counter to disable said counter during initial cycles of the machine operation in order to avoid false readings.

4. A device for detecting improper thread use in an average stitching cycle of a sewing machine as described in claim 2 wherein the first counter is disabled after its preset sum is reached and, under normal conditions, is reset along with the second counter by a signal from said second counter which occurs after the preset sum of machine cycles have been performed.

* * * * *

UNITED STATES PATENT OFFICE
CERTIFICATE OF CORRECTION

Patent No. 3,843,883          Dated October 22, 1974

Inventor(s) Raymond A. De Vita et al.

It is certified that error appears in the above-identified patent and that said Letters Patent are hereby corrected as shown below:

Column 7, delete, lines 27 through 39;

line 40, "2." should read -- 1. --.

Column 8, line 31, "3." should read -- 2. --;

line 33, claim reference numeral "2" should read -- 1 --;

line 37, "4." should read -- 3. --;

line 39, claim reference numeral "2" should read -- 3 --.

On the cover page "4 Claims" should read -- 3 Claims --.

Signed and Sealed this

Twenty-fourth Day of April 1979

[SEAL]

Attest:

RUTH C. MASON
*Attesting Officer*

DONALD W. BANNER
*Commissioner of Patents and Trademarks*